United States Patent [19]

Boegh et al.

[11] Patent Number: 4,738,682

[45] Date of Patent: Apr. 19, 1988

[54] CLARIFICATION AGENT FOR COLORED CELLULOSE FABRICS AND METHOD FOR TREATMENT OF SUCH FABRICS

[75] Inventors: Kirsten Boegh, Lyngby, Denmark; Soren J. Jepsen, Vienna, Austria

[73] Assignee: Novo Industri A/S, Bagsvaerd, Denmark

[21] Appl. No.: 914,269

[22] Filed: Oct. 2, 1986

[30] Foreign Application Priority Data

Oct. 8, 1985 [DK] Denmark ............................ 4571/85

[51] Int. Cl.[4] ............................................ C09B 67/00

[52] U.S. Cl. ........................................ 8/401; 435/263; 435/264; 252/174.12; 252/DIG. 12

[58] Field of Search ......... 252/89.1, 174.12, DIG. 12; 8/401; 435/263, 264, 209, 277

[56] References Cited

U.S. PATENT DOCUMENTS

| | | | |
|---|---|---|---|
| 4,155,868 | 5/1979 | Kaplan et al. | 252/DIG. 12 |
| 4,435,307 | 3/1984 | Barbesgaard et al. | 252/174.12 |
| 4,443,355 | 4/1984 | Murata et al. | 252/DIG. 12 |
| 4,597,886 | 7/1986 | Goedhart et al. | 252/174.12 |
| 4,610,800 | 9/1986 | Durham et al. | 252/174.12 |
| 4,661,289 | 4/1987 | Parslon et al. | 252/174.12 |

FOREIGN PATENT DOCUMENTS 1368599 10/1974 United Kingdom .

OTHER PUBLICATIONS

Harris-"Detergency Evaluation and Testing" Interscience Pub. Ltd (1954) pp. 60, 61.

AF 187/1 (Danish), AF 187/2-GB (English), AF 149/6-GB (English), Novo Industri A/S, 1982.

*Primary Examiner*—Paul Lieberman
*Assistant Examiner*—Hoa Van Le
*Attorney, Agent, or Firm*—Morris Fidelman; Franklin D. Wolffe

[57] ABSTRACT

Treatment of colored cellulose fiber fabrics for at least fifteen minutes with an aqueous solution of cellulase containing at least about 250 CMC units per liter under pH conditions conducive to high activity for the cellulase clarifies the color.

7 Claims, 3 Drawing Sheets

Figure 1:
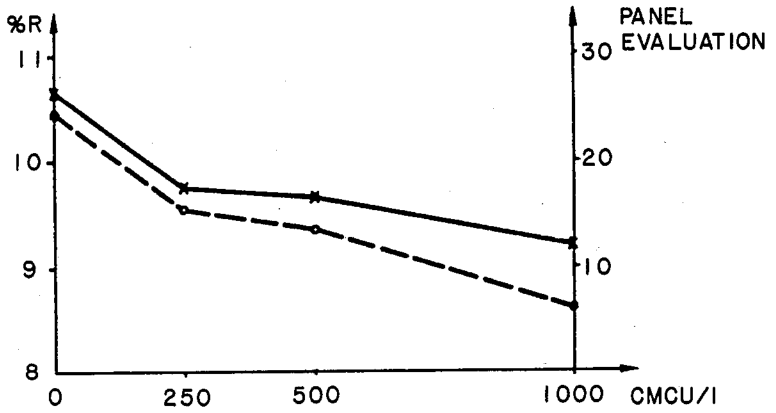

CLARIFICATION AGENT FOR COLORED CELLULOSE FABRICS AND METHOD FOR TREATMENT OF SUCH FABRICS

This invention relates to retention of color values on fabrics formed from cellulose fibers and to a method for treatment of such fabrics, e.g., colored fabrics manufactured from cotton, flax, hemp, jute, ramie, rayon, or from mixtures containing one or more cellulose fibers.

INTRODUCTION

Clothes made from cellulose fabrics often develop a grayish cast or appearance with wear and repeated washing. This unwanted effect is particularly evident in garments dyed with dark colors. It is believed that the grayish cast is caused, at least in part, by generation of disordered fibers through mechanical action. The mechanical action incident to washing tears, splits and/or breaks fibers, generating superficial disorder at the surface of the strands or threads from which the garment is made. Even after a thorough washing in which all ordinary dirt, e.g., protein, oil, starch and dust, has been removed, the clothes look faded and worn.

Thus, a need exists for a color clarification agent to reestablish the attractive look of fabrics which have developed a grayish cast, thereby offering the consumer a chance to avoid discarding worn looking, but still servicable cellulose fabric garments.

Now surprisingly, according to the invention, it has been found that the attractiveness of colored cellulose fabrics, which have developed a grayish appearance, can be reestablished by treatment of the fabric in an aqueous, cellulase containing medium.

BRIEF STATEMENT OF THE INVENTION

Thus, the invention comprises a clarification treatment agent for colors on cellulose fabrics consisting essentially of cellulase along with pH adjusting material(s). The cellulase content and pH adjusting materials should be enough to provide at least 250 CMC units per liter of aqueous fabric treating solution and a pH therein conducive to high activity for the cellulase. It is to be understood that the cellulase can be used in admixture with additives consistent with the desired color clarification e.g., sequestrants and surfactants, or be employed together with formulated detergents. Also, it is to be understood that the cellulase can be any cellulase known to the art. Some microbially produced cellulases are preferred, as will appear from the following.

The aqueous treating solution per se and the treatment method form part of the invention.

Treatment of the fabric with aqueous relatively concentrated cellulase solution reduces the level of disorder on the strands or threads of the fabric.

DISCUSSION OF THE INVENTION

To the best of the knowledge of the inventors hereof, no one has previously solved this problem of grayish cast on cellulose fabrics. Thus, our invention is not an invention of a new agent for a specific purpose in relation to which some inferior agents are known to the art, but is the very first agent offered to fulfill this color clarification purpose, and furthermore, cellulase fulfills the purpose excellently.

The invention as explained above is directed to colored cellulose fabrics, i.e., fabrics with another color than white. However, the cellulase will remove the disordered fibers on a white fabric as well, but this action will be much less visible to the naked eye than on fabrics with another color than white. The effect is most striking on fabrics of dark colors.

It appears from Great Britain Pat. No. 1,368,599 that cellulases can be used as a harshness reducing agent for harsh fabrics, and also, it appears from U.S. Pat. No. 4,435,307 that a special cellulase, i.e., the *Humicola insolens* cellulase can be used for this purpose. It is to be understood, however, that the harshness reducing effect and the color clarification effect are two different effects, inasmuch as the former is needed in relation to fabrics with a stiff feeling and the latter is needed in relation to fabrics with a grayish cast.

It is noted that the harshness effect (generated by washing of fabrics) has been attributed to deposition of sparingly soluble calcium salts, (e.g., phosphates) in and/or on the fibers. If such is true, exactly why treatment with cellulase reduces harshness is not known. The harshness effect also has been attributed to disorder at the fiber surface, and, if such be true, treatment with cellulase constitutes a logical suggestion. However, the cationic surfactants widely used for fabric softening purposes do not ameliorate generation of a grayish cast on colored cellulose fabrics. Thus, when the objective is to improve the color of a fabric with a grayish appearance, no guidance can be derived from the knowledge that treatment of the fabric with cellulase reduces harshness.

The treatment procedure of this invention constitutes subjecting the cellulose fabric to an aqueous rinse using a pH adjusted relatively concentrated aqueous solution of cellulase, i.e., at least about 250 CMC units of cellulase per liter of water. A desirable treatment regimen is 15–90 minutes of mild agitation in a 40°–75° C. solution of the cellulase, pH at about pH optimum for the cellulase in a household washing machine. If desired, the fabric may be left soaking overnight. The volume of water is not particularly related to the weight or volume of fabric treated, but should be sufficient for complete immersion of the fabric and for facile agitation of the fabric in the solution.

As compared to the prior art employment of cellulase as a component in detergent formulations (see for example, U.S. Pat. No. 4,435,307), wherein less than about 100 CMC units per liter of wash solution is suggested, the color clarification method of this invention employs several times the cellulase concentration and uses the cellulase at about the pH for optimum activity.

The treatment agent differs from cellulase detergent additives for containing therein (besides the cellulase) a pH adjustment ingredient so that pH of the fabric treatment solution will be at about the optimum pH of the cellulase. If the treatment agent is a liquid cellulase concentrate, presence of stablizer(s) for the cellulase is desirable. Typically, the treatment agent will be in a unit form, e.g., a tablet, or encapsulated liquid concentrate of cellulase activity related to the water addition settings of household washing machines, so that a suitable predetermined cellulase activity and pH, e.g., 750 CMC per liter, pH 6.5 will result in the rinse water.

Tablet Formulation

40% tartaric acid 53.3% sodium hydrogen carbonate

5% polyvinylpyrrolidone (Kollidon VA 64, BASF A/G)

1.7% Macrogol 6000 lubricant 1 g/l is dosed

Also included in the tablet is the cellulase preparation No. 4 described hereafter giving rise to an activity of 1.500 NCU/liter of treating solution.

Non-Dusting Granulate Formulation

- 25% concentration of the cellulase preparation No. 1 described hereafter
- 10% cellulose powder-CEPO S20 (The Swedish Cellulose Powder and Wood Flour Mills Ltd.)
- 1% polyvinylpyrrolidone (PVP K30)
- 2% titanium dioxide
- 62% sodium chloride Liquid Formulation

- Solvent 20% propylene glycol, 80% water
- Calcium formate 0.5 mol/kg
- Calcium chloride 0.2% w/w
- Cellulase preparation No. 1 (described hereafter) to an activity of 1000 CMCU/g Due to the fact that the pH activity optimum varies considerably from one type of cellulase to another, two different activity determination methods are used in relation to the invention. The CMC cellulase activity unit (CMCU) is defined in the publication AF 187/1 (pH 7.0). The NOVO cellulase activity unit (NCU) is defined in the publication AF 149/6-GB (pH 4.8). Both publications are available upon request from NOVO INDUSTRI A/S, Novo Alle, 2880 Bagsvaerd, DENMARK.

In a preferred embodiment of the agent according to the invention, the cellulase is *Humicola insolens* cellulase. This cellulase is commercially available.

In a preferred embodiment of the invention, the cellulase is *Sporotrichum pulverulentum* cellulase. This cellulase exhibits a slightly acid pH optimum and is, therefore, well suited for treatment in a slightly acid aqueous medium with acid auxiliary treatment agents.

In a preferred embodiment of the invention, the cellulase is *Fusarium oxysporum* cellulase. This cellulase exhibits a pH optimum sufficiently alkaline to be compatible with a detergent containing washing solution.

In a preferred embodiment of the invention, the cellulase is *Trichoderma reesei* cellulase. This cellulase is commercially available and, furthermore, exhibits a slightly acid pH optimum and is, therefore, well suited for treatment in a slightly acid aqueous medium with acid auxiliary treatment agents.

In a preferred embodiment of the invention, the treatment agent contains a cellulase activity corresponding to at least 500 CMC cellulase activity units per gram of agent. In this manner, the color clarification effect can be provided with a reasonable dosage rate of the agent.

In a preferred embodiment of the invention, the treatment agent is a non-dusting granulate. This formulation is inexpensive and if desired, can easily be incorporated into a detergent.

In a preferred embodiment of the invention, the treatment agent is contained in a tablet. This embodiment provides an exact and easily controllable dosage.

In a preferred embodiment of the invention, the treatment agent is an aqueous liquid, preferably with a cellulase stabilizing agent. This embodiment does not exhibit any dust hazard and is instantly distributed in the aqueous treating medium.

In a preferred embodiment of the invention, the treatment agent is contained in a bag of a material which disintegrates at a temperature of at least 40° C. or is soluble in the treating liquid. This embodiment makes dosage extremely easy for the consumer.

Since the method of this invention constitutes a rinse treatment of a fabric in order to provide color clarification in an aqueous liquid containing the color clarification agent, it is emphasized that this method is not a washing process. The disordered fibers or fiber parts removed from the fabric are not dirt, but are genuine constituents of the fabric. This treatment can be a soaking without movement of the treating liquid or a treatment with simultaneous stirring or other dynamic influence exerted on the fabric in the treating liquid.

However, washing of the colored cellulose fabric can be combined with color clarification if the cellulase concentration in the wash water is increased to more than 250 CMC units per liter of wash water. The cellulase concentrations employed by the art for detergency purposes, i.e., to avoid the harshness effect, are insufficient for color clarification purposes. However, a pattern of always washing colored cotton garments with cellulase containing detergent formulations will probably prevent generation of the grayish cast, and over time might improve the color of already faded fabrics.

Practice of this invention is particularly directed to restoration of good color in a favorite faded cellulose garment. For such a single purpose, one-time treatment, any cellulase may be employed, including the prefered cellulases alluded to above (not all of which are suited for detergent additive purposes).

In a preferred embodiment of the method according to the invention, the pH value and the temperature of the aqueous treatment medium is favorable for the activity and stability of the cellulase, and the treatment time is sufficient for at least a reasonable degree of cellulolytic action. In this manner, an acceptable color clarification effect will be obtained.

In a preferred embodiment of the method according to the invention, the cellulolytic activity of the aqueous medium is above 250 CMC cellulase activity units/liter of aqueous medium. A cellulolytic activity below 250 CMC cellulase activity units/liter of aqueous medium normally will not provide an acceptable color clarification effect.

In this connection, reference is made to the attached drawing wherein

FIGS. 1–6 are graphs that illustrate the color clarification effect of increasing cellulase concentration. The particulars of FIGS. 1–6 are given in the Examples hereinafter provided.

The cellulase preparations used in the Examples as the active constituent of the clarification agent according to the invention were produced microbially in manner known to the art. The preparations were produced in pilot plant scale. Reference is made to the following Table which shows the main data for the cellulase preparations with a reference number for each preparation. For easier identification, reference is made to the preparations employed in the Examples.

TABLE I

| Family | Microorganism | pH Optimum | Cellulase Activity CMCU/g | Cellulase Activity NCU/g | Preparation No. | Example No. |
|---|---|---|---|---|---|---|
| Asco- | *Humicola* | 6.5 | 14,760 | | 1 | 1,2,3,5 |

TABLE I-continued

| Family | Microorganism | pH Optimum | Cellulase Activity CMCU/g | NCU/g | Preparation No. | Example No. |
|---|---|---|---|---|---|---|
| mycetes | *insolens* | | | | | |
| | *Myceliophtora thermophila* | 6.0 | 10,783 | | 2 | 3 |
| | *Fusarium oxysporum* | | 6,350 | | 3 | 3 |
| | *Trichoderma reesei* | 4.8 | | 1,680 | 4 | 4 |
| Basidio-mycetes | *Sporotrichum pulverulentum* | | | 6,000 | 5 | 4 |
| | *Irpex lacteus* | | | 29,000 | 6 | 4 |

The invention will be illustrated by the following Examples.

EXAMPLE 1

Two old dark gray cotton shirts were cut into two equal pieces. The two half shirts were treated twice under the following conditions:

An AEG-washing machine was used vide the brochure LAVAMAT, BELLA 802, AEG H 245240335 from AEG, Roskildevej 8-10, 2620 Albertslund, Denmark.

The used program was No. 2 (40° C.) with tap water and cellulase with an activity of 600 CMCU/liter (cellulase originating from Preparation No. 1). The other two half shirts were not treated at all.

The cellulase treated halves were much more attractive than the untreated, i.e., the grayish look was totally eliminated on the cellulase treated halves.

EXAMPLE 2

An old dark blue cotton shirt was cut into four pieces which were treated under the following conditions:

A Terg-O-tometer test washing machine was used. The Terg-O-tometer test washing machine is described in Jay C. Harris, "Detergency Evaluation and Testing," Interscience Publishers Ltd., (1954,) pp. 60–61.

The test was carried out at 40° C. and 100 rpm for thirty minutes. The cellulase used in this Example was Preparation No. 1. The cellulase dosages were 0, 250, 500, 1000 CMCU/liter. In all cases, 3.5 g/l $KH_2PO_4$ and 7.3 g/l $Na_2HPO_4 2H_2O$ was added in order to obtain a pH value of 7 in the solutions.

The swatches were compared by a test panel and by measurement of light reflection respectively. The reflection measurements were carried out at 460 nm with an ELREPHO 2000 spectrophotometer from Datacolor S.A., Brandbachstrasse 10, CH-8305 Dietlikon (Switzerland).

The light reflection, %R (full drawn lines) versus cellulase activity in CMCU/l is shown in FIG. 1. The grayish shade of the untreated swatches causes a higher light reflection. The effect of cellulase on the gray shade appears clearly from FIG. 1.

The test panel consisted of six persons, each ranking the swatches according to the visual appearance. The most attractive was assigned a score of 1, the second best a score of 2 and so on. The total score for each swatch was calculated by adding the scores given by each member of the panel. The result of the panel evaluation shown in FIG. 1 (dotted lines) matches the light reflection well.

Figure 4:
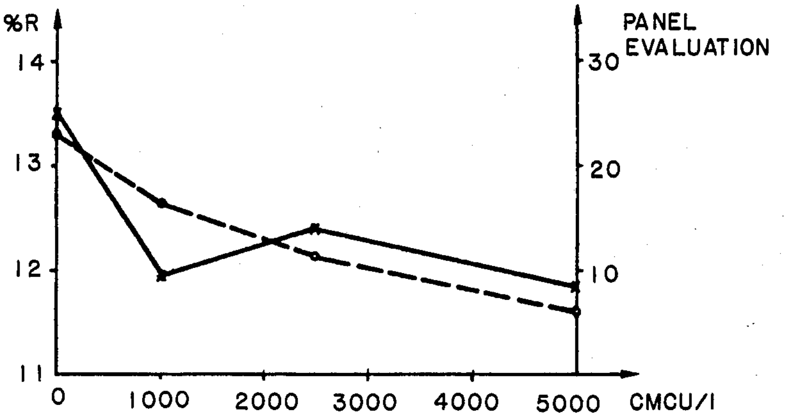
Figure 5:
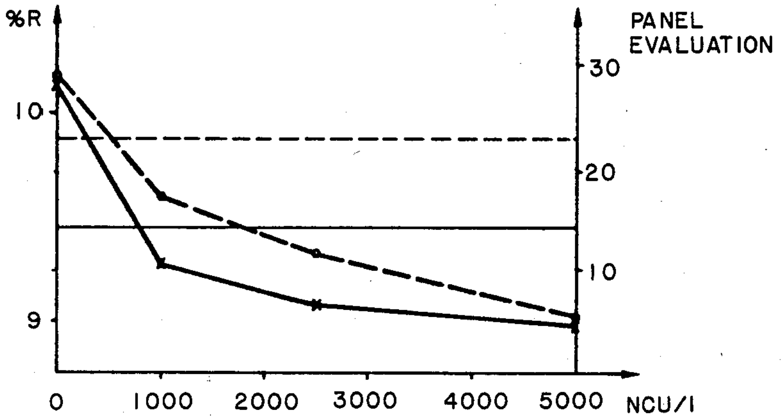
Figure 6:
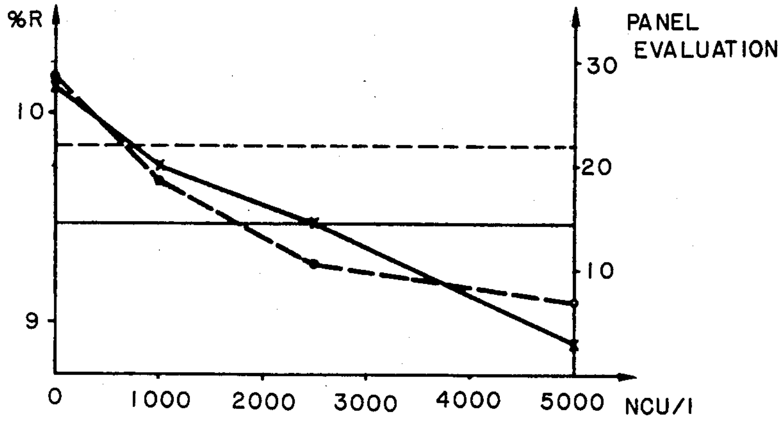
Figure 7:
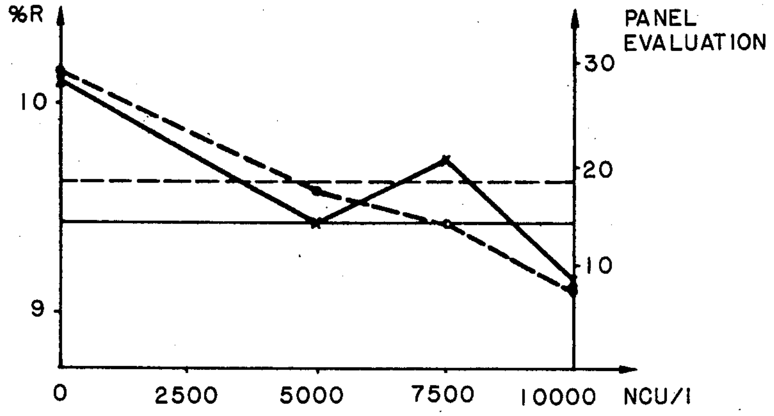

Also in the following Figures (FIGS. 2–7) the full drawn lines represent light reflection readings and the dotted represent the lines panel evaluations. The horizontal lines in FIGS. 5, 6 and 7 represent values for the unwashed samples.

EXAMPLE 3

An old dark blue cotton shirt was cut into two swatches which were treated under the following conditions:

A Terg-O-tometer test washing machine was used. The test was carried out at 40° C. and 100 rpm for thirty minutes. The cellulases used in this Example were Preparation Nos. 1, 2 and 3 respectively. The cellulase dosages were 0, 1000, 2500 and 5000 CMCU/liter. In all cases 2.6 g/l of tris(hydroxymethyl)aminomethan and 1.2 g/l of maleic acid was added in order to adjust the pH value to 7.1.

Figure 2:
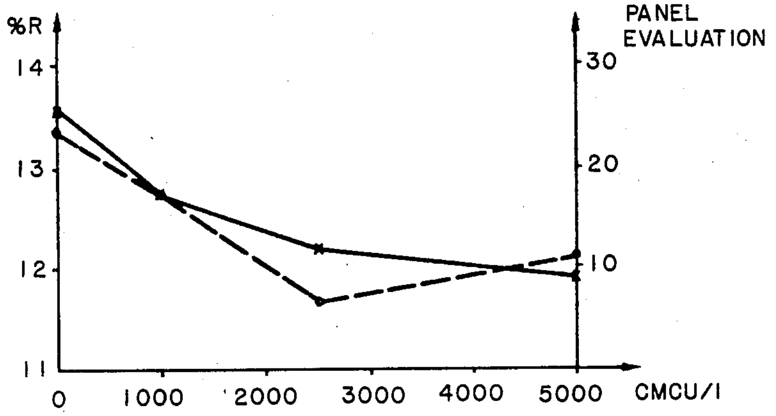
Figure 3:
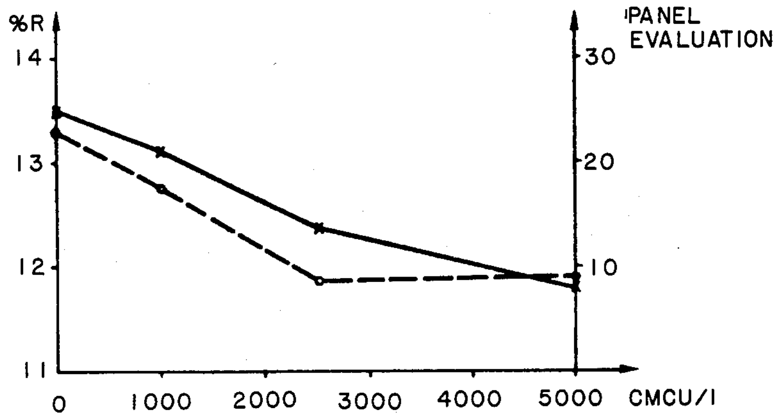

The swatches were compared as indicated in Example 2. The results of the evaluation are shown in FIGS. 2, 3 and 4 corresponding to Preparation Nos. 1, 2 and 3 respectively. In all cases the panel evaluations and the light reflection matches well. In order to provide an impression of the scattering of the evaluation, from one person to another in the panel, reference is made to the following Tables with values for panel evaluation and light reflection.

PREPARATION NO. 1 - CELLULASE DOSAGE (CMCU/l)

| Person No. | 0 | 1000 | 2500 | 5000 |
|---|---|---|---|---|
| 1 | 4 | 3 | 1 | 2 |
| 2 | 4 | 3 | 1 | 2 |
| 3 | 4 | 3 | 1 | 2 |
| 4 | 4 | 3 | 1 | 2 |
| 5 | 4 | 3 | 1 | 2 |
| 6 | 4 | 3 | 2 | 1 |
| Total Score | 24 | 18 | 7 | 11 |
| % R at 460 nm | 13.6 | 12.8 | 12.2 | 11.9 |

PREPARATION NO. 2 - CELLULASE DOSAGE (CMCU/l)

| Person No. | 0 | 1000 | 2500 | 5000 |
|---|---|---|---|---|
| 1 | 4 | 3 | 2 | 1 |
| 2 | 4 | 3 | 1 | 2 |
| 3 | 4 | 3 | 1 | 2 |
| 4 | 4 | 3 | 2 | 1 |
| 5 | 4 | 3 | 2 | 1 |
| 6 | 4 | 3 | 1 | 2 |
| Total Score | 24 | 18 | 9 | 9 |
| % R at 460 nm | 13.6 | 12.8 | 12.4 | 11.8 |

| PREPARATION NO. 3 - CELLULASE DOSAGE (CMCU/l) | | | | |
|---|---|---|---|---|
| Person No. | 0 | 1000 | 2500 | 5000 |
| 1 | 4 | 3 | 2 | 1 |
| 2 | 4 | 3 | 2 | 1 |
| 3 | 4 | 2 | 3 | 1 |
| 4 | 4 | 3 | 2 | 1 |
| 5 | 4 | 3 | 2 | 1 |
| 6 | 4 | 3 | 1 | 2 |
| Total Score | 24 | 17 | 12 | 7 |
| % R at 460 nm | 13.6 | 12.0 | 12.5 | 11.9 |

EXAMPLE 4

An old dark blue cotton shirt was cut into swatches which were treated under the following conditions:

A Terg-O-meter test washing machine was used. The test was carried out at 40° C. and 100 rpm for thirty minutes. The cellulases used in this Example were Preparation Nos. 4, 5 and 6 respectively. The cellulase dosages were 0, 1000, 2500 and 5000 NCU/liter for Nos. 4 and 5, and 0, 5000, 7500 and 10,000 NCU/liter for No. 6. In all cases 0.12 mole/liter of $CH_3COOH$ and 0.2 mole/liter of NaOH were added in order to adjust the pH value to 4.8.

An untreated swatch was included in the evaluation.

The swatches were compared by a test panel (as described in Example 2) and by measurement of light reflection at 460 nm. The results of the panel evaluation and the light reflection measurements appear from FIGS. 5, 6 and 7 corresponding to Preparation Nos. 4, 5 and 6 respectively.

The horizontal lines on FIGS. 5, 6 and 7 correspond to the untreated and unwashed swatch. Thus, it appears from FIGS. 5, 6 and 7 that the treatment without enzyme generates an even more grayish appearance.

The consistency of the panel evaluations in this Example turned out to be quite similar to the already documented consistency of the panel evaluation in Example 3.

EXAMPLE 5

A used, but clean cotton shirt with yellow, red, blue and green stripes was cut into two pieces of equal size. One piece was treated under the following conditions:

A MIELE W 761 washing machine was used vide the brochure "Brugsanvisning for vaskemaskine W 761", Miele a/s, Erhvervsvej 2, 2600 Glostrup, Denmark.

The program used was "Kort kulørtvask 60° C.," i.e., one wash cycle of a duration of around 75 minutes, temperature increasing from 12° C. to 60° C. during the wash. The treating liquid was dionized water and cellulase with an activity of 6000 CMCU/liter (cellulase originating from Preparation No. 1).

The other piece of the shirt was not treated at all.

The cellulase treated piece was much more attractive than the untreated, i.e., the grayish look was eliminated totally on the cellulase treated piece.

We claim:

1. A color clarification method which comprises treating clean colored but faded cellulose fiber fabrics with an aqueous solution of cellulase for at least fifteen minutes, the cellulase concentration exceeding 250 CMC units per liter and the pH being at a level conducive to high activity for the cellulase.

2. The method of claim 1 further comprising treating at about the pH optimum of the cellulase.

3. The method of claim 1 further comprising treating at a solution temperature in the range of 40°–75° C. for 15–90 minutes.

4. The method of claim 1 wherein the cellulase is *Humicola insolens* cellulase.

5. The method of claim 1 wherein the cellulase is *Sporotrichum pulverulentum* cellulase.

6. The method of claim 1 wherein the cellulase is *Fusarium oxysporum* cellulase.

7. The method of claim 1 wherein the cellulase is *Trichoderma reesei* cellulase.

* * * * *